United States Patent [19]

Ohta et al.

[11] Patent Number: 4,678,285
[45] Date of Patent: Jul. 7, 1987

[54] LIQUID CRYSTAL COLOR DISPLAY DEVICE

[75] Inventors: Wasaburo Ohta, Yokohama; Takamichi Enomoto, Kanagawa; Kiyohiro Uehara, Yokohama, all of Japan

[73] Assignee: Ricoh Company, Ltd., Tokyo, Japan

[21] Appl. No.: 690,267

[22] Filed: Jan. 10, 1985

[30] Foreign Application Priority Data

| Jan. 13, 1984 | [JP] | Japan | 59-5094 |
| Jun. 12, 1984 | [JP] | Japan | 59-120153 |
| Oct. 11, 1984 | [JP] | Japan | 59-213175 |
| Oct. 26, 1984 | [JP] | Japan | 59-225245 |
| Oct. 26, 1984 | [JP] | Japan | 225246 |

[51] Int. Cl.⁴ .............................................. G02F 1/13
[52] U.S. Cl. ................................. 350/345; 350/339 F
[58] Field of Search .............. 313/112, 487, 485, 484; 350/345, 337, 339 F

[56] References Cited

U.S. PATENT DOCUMENTS

| 2,181,305 | 11/1939 | Myers | 313/487 |
| 2,247,409 | 7/1941 | Roper et al. | 313/112 X |
| 2,269,819 | 8/1938 | Isenberg | 313/487 |
| 2,290,186 | 7/1942 | Holman et al. | 313/112 |
| 2,774,903 | 12/1956 | Burns | 313/112 X |
| 3,559,190 | 1/1971 | Bitzer et al. | 313/484 |
| 3,562,737 | 12/1967 | Wiederhorn et al. | 313/485 X |
| 3,654,505 | 4/1972 | Davis et al. | 313/112 X |
| 3,767,956 | 10/1973 | Bauer | 313/485 |
| 3,837,730 | 9/1974 | Hatfield | 350/349 |
| 3,840,695 | 10/1975 | Fischer | 350/345 X |
| 3,858,082 | 12/1974 | Thornton | 313/487 |
| 3,869,195 | 3/1975 | Aldrich et al. | 350/345 |
| 3,869,196 | 3/1975 | Kubota | 350/337 |
| 3,890,522 | 6/1975 | Klein | 313/485 |
| 4,289,383 | 9/1981 | Schwarzchild | 350/345 X |
| 4,470,667 | 9/1984 | Okubo et al. | 350/334 X |
| 4,506,956 | 3/1985 | Dir | 350/349 X |
| 4,527,864 | 7/1985 | Dir | 350/337 |
| 4,560,241 | 12/1985 | Stocov et al. | 350/339 F X |
| 4,579,424 | 4/1986 | Matsukawa et al. | 350/339 F |
| 4,580,877 | 4/1986 | Washo | 350/345 |

FOREIGN PATENT DOCUMENTS 3022623 1/1982 Fed. Rep. of Germany ...... 350/345

*Primary Examiner*—John K. Corbin
*Assistant Examiner*—David Lewis
*Attorney, Agent, or Firm*—Oblon, Fisher, Spivak, McClelland & Maier

[57] ABSTRACT

A liquid crystal color display device for displaying a color image represented by an applied image signal, including a liquid crystal cell, one or two polarizers, and a fluorescent light-emitting means. The liquid crystal cell and one polarizer disposed on one side thereof, or the liquid crystal cell and the two polarizers sandwiching the same, jointly constitute a switching element responsive to the image signal applied to the liquid crystal cell for passing electromagnetic radiation in a pattern representing the image given by the image signal. The fluorescent light-emitting means has a fluorescent layer and a lamp for generating electromagnetic radition, and may additionally include a color filter. The fluorescent layer is responsive to the electromagnetic radiation from the lamp for emitting chromatic fluorescent light. Where the fluorescent light-emitting means has the color filter, the fluorescent light passes through the color filter to display the image.

19 Claims, 35 Drawing Figures

LIQUID CRYSTAL COLOR DISPLAY DEVICE

BACKGROUND OF THE INVENTION

1. Field of the Invention

The present invention relates to a liquid crystal color display device, and more particularly to a liquid crystal color display device for use in a television receiver of a flat configuration, an office-automation component, and other image display systems.

2. Discussion of the Background

Heretofore, color display devices have typically employed CRTs (cathode-ray tubes) and have widely been used in television display units, OA (office automation) components, and other display units. The CRT is a type of vacuum tube having a large conical shape. The display unit composed of the CRT must therefore be powered by a high-voltage power supply, requires a complex driver circuit, and is large in overall size.

Recent years have seen the development of panel-shaped liquid crystal display devices, which have resulted in pocketable liquid crystal color television receivers. As described in a periodical "Nikkei Electronics", 1983, 5-23, pages 102 to 103, such a pocketable liquid crystal color television receiver comprises a liquid crystal panel composed of a glass plate having red, green, and blue color filters assigned to each pixel, another transparent plate with an array of thin-film transistors disposed thereon, a TN (twisted nematic) liquid crystal material sealed between the plates, and a pair of polarizers sandwiching the plates, and an illuminating light source positioned behind the liquid crystal panel. The thin-film transistors are fabricated in association with the red, green, and blue color filters of the respective pixels for switching light. However, the liquid crystal color display device described above still remains to be improved since color generation and reproduceability are insufficient due to the use of the optical filters, and displayed images have a low contrast and hence cannot be seen well.

SUMMARY OF THE INVENTION

Accordingly, it is an object of the present invention to provide an improved liquid crystal color display device which is of a low profile and capable of producing clear color images.

According to the present invention, a liquid crystal color display device has a liquid crystal cell, one or two polarizers, and a fluorescent light-emitting means.

The liquid crystal cell has a pair of transparent plates, a sealing frame, and a liquid crystal material sealed in a cell defined by the transparent plates and the sealing frame. The sealed liquid crystal material may be a twisted nematic (hereinafter referred to as "TN") liquid crystal, a guest-host (hereinafter referred to as "G-H"), or the like. The transparent plates support electrodes disposed thereon in sandwiching relation to the liquid crystal material and having a form selected dependent on images to be displayed. For example, the electrodes may be combined to provide a two-dimensional matrix of pixels or segments of pixels, as described later on with respect to embodiments of the present invention.

One polarizer is employed in the case where the liquid crystal cell contains a G-H liquid crystal, and is disposed on one side of the liquid crystal cell. Two polarizers are disposed in sandwiching relation to the liquid crystal cell. The one or two polarizers and the liquid crystal cell jointly constitute a switching element for passing electromagnetic radiation dependent on an image represented by an image signal applied to the liquid crystal cell.

The fluorescent light-emitting means has at least a fluorescent layer and a lamp, and may also have a color filter. Thus, one form of the fluorescent light-emitting means has a fluorescent layer and a lamp, and another form of the fluorescent light-emitting means has a fluorescent layer, a lamp, and a color filter.

The fluorescent layer includes a layer of a fluorescent material capable of emitting desired fluorescent radiation of chromatic color in response to electromagnetic radiation emitted from the lamp. An image represented by an image signal applied by the liquid crystal cell is displayed by fluorescent radiation emitted from the fluorescent layer.

The color filter is employed to pass fluorescent radiation emitted by the fluorescent layer to adjust the intensity of emitted fluorescent radiation or reduce the wavelength range of the passing fluorescent radiation for making the same approach monochromatic light.

The lamp radiates electromagnetic radiation to enable the fluorescent layer to emit fluorescent radiation. The electromagnetic radiation emitted by the lamp must be responsible for enabling the fluorescent layer to emit fluorescent radiation, and for this reason may not necessarily be visible light.

The fluorescent layer may be disposed in front of, behind, or within the liquid crystal cell as seen from an observer of the liquid crystal color display device, and may be mounted, as desired, on an inner or outer wall surface of the lamp, a surface of the polarizer, the transparent plate of the liquid crystal cell, or a transparent plate provided for supporting the fluorescent layer.

The color filter may be disposed in a desired position in front of the fluorescent layer as seen from the observer of the liquid crystal color display device, and may be mounted on an inner or outer wall surface of the lamp, a surface of the polarizer, or the transparent plate of the liquid crystal cell.

The liquid crystal color display device of the foregoing construction is of a low profile as a whole. Since images are displayed directly by emitted fluorescent radiation, the display images are much brighter than those on conventional display devices. The liquid crystal color display device can display as bright and clear colored images as those displayed on cathode-ray tubes for use in color television recievers. The use of the color filter makes displayed images clearer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
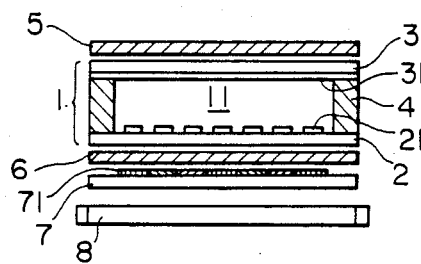
FIG. 1 is an exploded cross-sectional view of a liquid crystal color display device according to an embodiment of the present invention.

Referring now to the drawings, wherein like reference numerals designate identical or corresponding parts throughout the several views, FIG. 1 shows a liquid crystal color display device according to an embodiment of the present invention, the liquid crystal color display device having a liquid crystal cell generally designated by the reference numeral 1. The liquid crystal cell 1 is composed of a TN liquid crystal material 11, a transparent plate 2 having a transparent pixel electrode 21, a transparent plate 3 confronting the transparent plate 2 and having a common electrode 31, and a peripheral sealing frame 4, the transparent plates 2, 3 and the sealing frame 4 jointly sealing the liquid crystal material 11. A first polarizer 5 is disposed on the transparent plate 3 which will be observed by an observer during operation of the liquid crystal cell 1. A second polarizer 6 is disposed on the opposite transparent plate 2 and has an axis of polarization normal to that of the first polarizer 5. The liquid crystal color display device also includes a transparent plate 7 disposed closely to the second polarizer 6 and supporting a fluorescent layer 71 thereon. The fluorescent layer 71 is composed of a mosaic of fluorescent layer elements aligned respectively with the pixel electrodes 21 for emitting fluorescent light in red, green, and blue in response to ultraviolet or near-ultraviolet radiation irradiating the fluorescent layer elements. The ultraviolet or near-ultraviolet radiation for exciting the fluorescent layer 71 to emit fluorescent radiation is radiated from a lamp 8 disposed adjacent to the transparent plate 7. The liquid crystal cell 1 and the polarizers 5, 6 jointly constitute a switching element, and the transparent plate 7, the fluorescent layer 71, and the lamp 8 jointly constitute a fluorescent light-emitting means.

The transparent pixel electrode 21 is composed of a matrix of minute electrode elements which can be driven or energized independently of each other. The other transparent electrode 31 is of a flat construction confronting all of the electrode elements of the transparent pixel electrode 21. Therefore, when a voltage is applied between a certain electrode element of the transparent pixel electrode 21 and the transparent electrode 31, the liquid crystal material 11 is subjected to an electric field only between the certain electrode element and the transparent pixel electrode 31. Under this condition, the electrode element will be referred to as being turned on. The electrode element which is not placed in the above condition will be referred to as being turned off.

The fluorescent layer 71 includes a mosaic arrangement of minute fluorescent layer elements capable of emitting red fluorescent light, minute fluorescent layer elements capable of emitting green fluorescent light, and minute fluorescent layer elements capable of emitting blue fluorescent light. The fluorescent layer elements in the mosaic arrangement are disposed in positionally corresponding relation to the electrode elements in the matrix of the transparent pixel electrode 21, so that when the observer sees the liquid crystal color display device in a direction normal to the polarizer 5 in FIG. 1, the electrode elements of the transparent pixel electrode 21 must look aligned with the corresponding fluorescent layer elements of the fluorescent layer 71.

Operation of the display device of FIG. 1 will be described with reference to FIG. 2.

Figure 2:
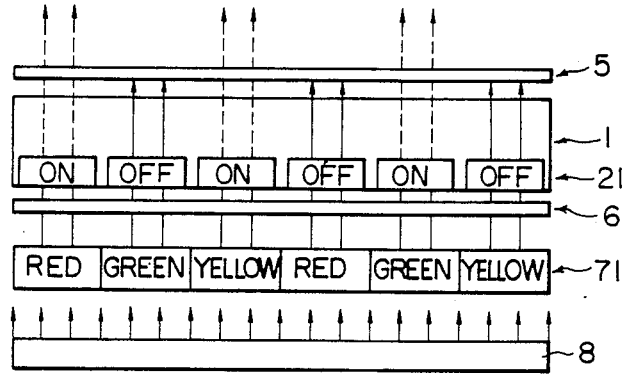
FIG. 2 is a schematic diagram illustrative of operation of the liquid crystal color display device shown in FIG. 1.

In FIG. 2, the blocks of the fluorescent layer elements of the fluorescent layer 71 are labelled with letters indicating the colors of fluorescent light emitted from the respective fluorescent layer elements. It is now assumed that the electrode elements are turned on and off as shown in FIG. 2 by an image signal applied to the liquid crystal cell 1 by thin-film transistors or the like (not shown).

When the lamp 8 is energized under such a condition, the lamp 8 emits ultraviolet or near-ultraviolet radiation to enable all of the fluorescent layer elements of the fluorescent layer 71 to emit fluorescent light of their own colors. The emitted fluorescent light as it has passed through the polarizer 6 becomes linearly or elliptically polarized light which is passed through the liquid crystal cell 1 and then falls on the polarizer 5. Since the axis of polarization of the polarizer 5 is normal to that of the polarizer 6, and the light having passed through the turned-off electrode elements keeps its direction of polarization unchanged, the same light indicated by the solid-line arrows cannot pass through the polarizer 5.

In regions where the electrode elements are energized, however, the orientation of molecules of the TN liquid crystal material is twisted through substantially 90° under the applied electric field, and hence the plane of polarization of the light having passed through the energized electrode elements is also twisted through substantially 90° into agreement with the axis of polarization of the polarizer 5. Therefore, only the light, as indicated by the broken-line arrows, having passed through the energized electrode elements can pass through the polarizer 5, and can be viewed as a color image by the observer.

Figure 3:
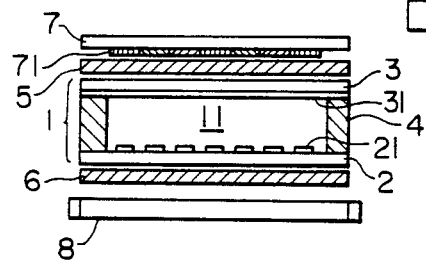
FIG. 3 is an exploded cross-sectional view of a liquid crystal color display device according to another embodiment of the present invention.
Figure 4:
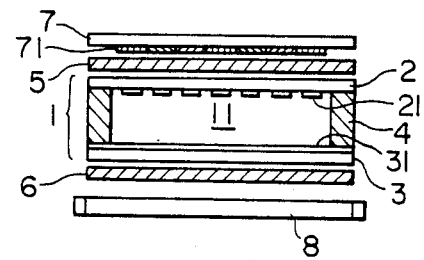
FIG. 4 is an exploded cross-sectional view of a liquid crystal color display device according to still another object of the present invention.

FIGS. 3 and 4 are illustrative of modifications of the embodiment of FIG. 1.

In the embodiment of FIG. 3, the transparent plate 7 is disposed outwardly of the first polarizer 5 with the fluorescent layer 71 facing the first polarizer 5. The fluorescent layer 71 is also composed of a mosaic of independent fluorescent layer elements aligned with respective electrode elements of the transparent pixel electrode 21. Since the fluorescent layer 71 is positioned more closely to the observer than it is in the embodiment of FIG. 1, the observer can observe clearer color images.

According to the embodiment of FIG. 4, the liquid crystal cell 1 is disposed such that the transparent pixel electrode 21 is closer to the observer, and the fluorescent layer 71 is positioned outwardly of the first polarizer 5. This arrangement reduces any positional deviation between the fluorescent layer elements of the fluorescent layer 71 and the electrode elements of the transparent pixel electrode 21, and produces clearer color images.

In the foregoing embodiments, the transparent electrode 31 is flat in configuration, and the transparent pixel electrode 21 has a matrix of electrode elements.

Figure 5:
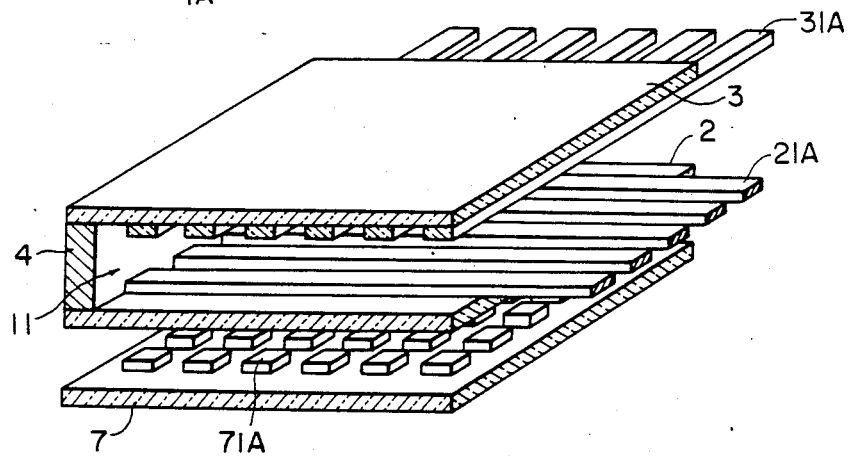
FIG. 5 is an exploded fragmentary perspective view of an arrangement of electrodes in a liquid crystal cell.

However, a liquid crystal cell 1A shown in FIG. 5 includes a transparent electrode 21A composed of stripes and a transparent electrode 31A composed of stripes extending perpendicularly to the stripes of the transparent electrode 21A. A fluorescent layer 71A comprises a matrix fluorescent layer elements aligned respectively with overlapping portions or intersections of the stripes of the transparent electrodes 21A, 31A. A driver circuit for the electrodes 21A, 31A is different from that in the embodiment of FIG. 1. More specifically, a voltage is impressed between one stripe of the transparent electrode 21A and one stripe of the transparent electrode 31A to apply an electric field to the liquid crystal material 11 between an overlapping portion or intersection of the energized electrode stripes.

Figure 6:
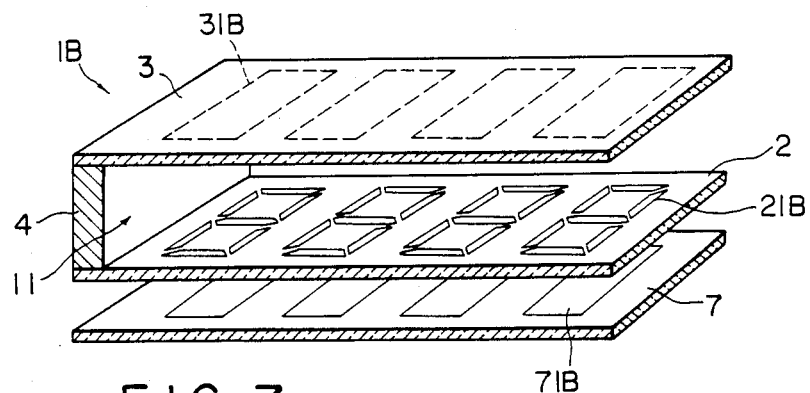
FIG. 6 is an exploded fragmentary perspective view of another arrangement of electrodes in a liquid crystal cell.

FIG. 6 shows still another embodiment in which a transparent pixel electrode 21B on the transparent plate 2 is a combination of 7-segment electrodes each in the shape of a numeral "8". A transparent electrode 31B on the transparent plate 3 is also composed of electrode elements each in the form of a numeral "8", and a fluorescent layer 71B on the transparent plate 7 is similarly composed of fluorescent layer elements each in the form of a numeral "8". The fluorescent layer elements may emit fluorescent light of any desired chromatic color. Alternatively, the fluorescent layer elements indicative of integers and those representative of fractions to the decimal point may emit fluorescent light of different colors, or the fluorescent layer elements representing numbers in the third and greater places and those in other places may emit fluorescent light of different colors.

Prior to the description of other embodiments, the components of the liquid crystal color display devices according to the foregoing embodiments will be described in specific detail.

The TN liquid crystal material 11 employed in the liquid crystal cell 1 has a property such that the orientation of molecules is twisted 90° between electrodes across which a voltage is applied, and in the absence of the applied voltage, the molecules are untwisted and line up parallel to each other. Almost all liquid crystal materials having the above property can be used for carrying out the present invention. Examples of such liquid crystal materials are given as below:

(1) Liquid crystal compound of p-alkylbenzylidene-p'-cyanoaniline and p-alkoxyoenzylidene-p'-cyanoaniline (2) Liquid crystal compound of phenyloenzoates

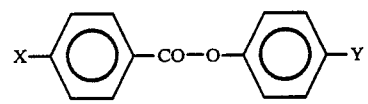

X, Y represent an alkyl group, an alkoxy group, etc.

(3) Liquid crystal compound of cyanobiphenyls and cyanoterphenyls

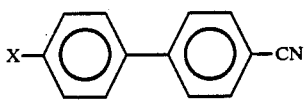

X is CnH2n + 1      n ranges from 3 to 10
   CnH2n + 10      n ranges from 3 to 10 n ranges from 3 to 7

CnH2n + 1 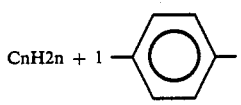

(4) Liquid crystal compound of cyclohexanecarboxylphenyleesters (5) Liquid crystal compound of phenylcyclohexanes and biphenylcyclohexanes (6) Liquid crystal compound of phenylpylimidines and phenyldioxanes (7) Mixture of the above liquid crystal compounds or mixture of the above liquid crystal compounds and cholesteric compounds The transparent plate 2 may be formed of glass or a plastic material such as polyester (PET), polysulfone polycarbonate (PC), polypropylene (PP), etc. A G-H liquid crystal cell may be used instead of the TN liquid crystal cell. With this modification, only one polarizer may be used as described above.

The transparent pixel electrode 21 is formed as electrode elements on the transparent plate 2 by depositing a transparent conductive film of $In_2O_3(Sn)$, or indium oxide doped with tin (Sn), by vacuum evaporation, sputtering, or CVD (chemical vapor deposition), or a transparent conductive film of $SnO_2(Sb)$, or tin oxide doped with antimony (Sb), by the same process, and dividing the transparent conductive film into smaller segments by a photoetching process. The transparent pixel electrode 21 has a thickness ranging from 500 Å to 200 Å and has a resistance of 10 kilohm. As described above, a voltage representative of a color image signal is applied to hte transparent pixel electrode 21 by TFTs (thin-film transistors), not shown.

The other transparent plate 3 is formed of the same material as that of the transparent plate 2, that is, glass or a plastic material. The transparent electrode 31 is formed on the transparent plate 3 in the same process and of the same material as the transparent electrode 21 is formed, but not divided into smaller segments.

The transparent pixel electrode 21 and the transparent electrode 31 are spaced from each other an interval ranging from 3 μm to 20 μm by the sealing frame 4 bonded to the transparent bases 2, 3 in order to seal the liquid crystal material 11 therebetween. From the electrode elements of the transparent pixel electrode 21, there extend lead wires (not shown) connected to an outer signal source for applying image signals. The sealing frame 4 may be formed of an epoxy resin, an aklyl resin, a cellulosic resin, or the like.

The transparent plate 7 supporting the fluorescent layer 71 is made of the same material as that of the transparent plates 2, 3 of the liquid crystal cell 1.

The fluorescent layer elements of the fluorescent layer 71 are made of fluorescent materials for emitting fluorescent light in red, green, and blue in response to ultraviolet or near-ultraviolet radiation radiated thereon. The fluorescent materials for emitting red fluorescent light include $Y_2O_2S$: Eu (yttrium oxysulfide : europium) and $Y_2O_2$: Eu (yttrium oxide : europium). The fluorescent materials for emitting green fluorescent light include ZnS :CuAl (zinc sulfide : doped with copper aluminum), (Zn Cd) S : Cu (zinc sulfide, cadmium : doped with copper), and zinc sulfide, cadmium : doped with silver (Ag). The fluorescent materials for emitting blue fluorescent light include ZnS : Ag (zinc sulfide : doped with silver) and (ZnS, ZnO) : Ag (zinc sulfide, zinc oxide : doped with silver).

For forming the fluorescent layer 71 on the transparent plate 7, a photoresist is used to mask other portions of the transparent plate 7 than positions where fluorescent layer elements are to be formed, and the surface of the transparent plate 7 is coated with a solution or suspension of a powdery fluorescent material, a binder as of a cellulosic resin or an aklyl resin, and an organic solvent. Then, the photoresist is removed by an inorganic or organic removal solution for thereby forming a first submatrix of fluorescent layer elements for emitting fluorescent light in one color. Similarly, second and third submatrixes of fluorescent layer elements for emitting fluorescent light in the other two colors. These first through third submatrixes of fluorescent layer elements jointly contitute the fluorescent layer 71.

The above process of forming the fluorescent layer 71 may be the same as the process of manufacturing cathode-ray tubes for use in color television receivers. Furthermore, inasmuch as the fluorescent layer of the invention is not used in a vacuum and is of a flat configuration, it may be formed by a printing process similar to a three-color gravure printing process. As an alternative, the fluorescent layer 71 may be formed by a lithographic process using a photoresist.

The polarizers 5, 6 may be formed of the same material. For example, they are fabricated by immersing a web of PVA (polyvinyl alcohol) which is not stretched in an aqueous solution of iodine, removing the web out of the aqueous solution, uniaxially stretching the web in one direction so that the length of the web will be 3 to 5 times the original length thereof, laminating the stretched web at both surfaces thereof with a polyester resin to preventing iodine from subliming away and also prevent the web from absorbing moisture from the atmosphere, and then cutting off the web to a desired size. According to the present invention, the polarizers 5, 6 thus manufactured are disposed such that their axes of polarization are normal to each other.

The lamp 8 may comprise a mercury lamp or UVF (ultraviolet fluorescent) lamp, for example, capable of emitting electromagnetic radiation, primarily ultraviolet and/or near-ultraviolet radiation which can excite the fluorescent layer 71 to emit fluorescent radiation. The lamp 8, singly or in plurality, is placed in a plane or juxtaposed for illuminating the surface of the liquid crystal cell 1 or the fluorescent layer 71.

It should be understood that the above components of the liquid crystal color display device can be manufactured in other processes and of other materials than described above without departing from the scope and spirit of the present invention.

Figure 7:
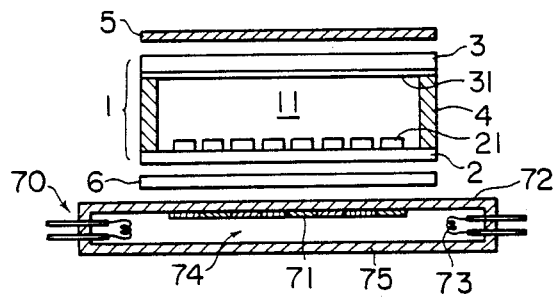
FIG. 7 is an exploded cross-sectional view of a liquid crystal color display device according to a further embodiment of the present invention.
Figure 8:
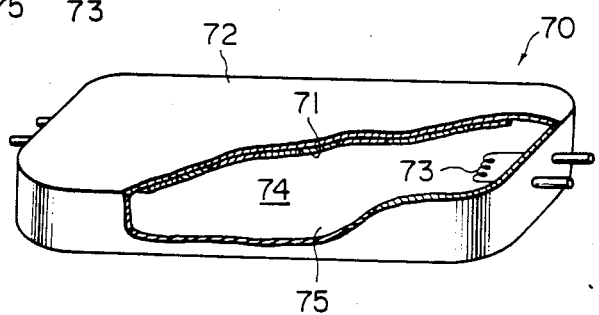
FIG. 8 is a perspective view, partly broken away, of a lamp as a fluorescent light-emitting means.

FIG. 7 shows another embodiment of the present invention in which the fluorescent layer 71 is disposed on an inner surface of a tubular wall of a lamp 70 closely to the liquid crystal cell 1. Therefore, the lamp 70 constitutes a fluorescent light-emitting means. FIG. 8 illustrates the lamp 70 in perspective with parts broken away. Argon and mercury are sealed as a sealed gas 74 in the lamp 70. When a current is passed through a filament 73, thermions are emitted from the filament 73 and ionize the sealed gas 74, during which time ultraviolet radiation is emitted to enable the fluorescent layer 71 to emit fluorescent radiation.

Figure 9:
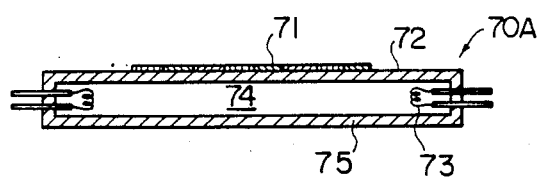
FIG. 9 is a cross-sectional view of another lamp as a fluorescent light-emitting means.

In a modification of the fluorescent light-emitting means illustrated in FIG. 9, a lamp 70A serving as the fluorescent light-emitting means has the fluorescent layer 71 disposed on an outer surface of a transparent plate 72 constituting a tube wall of the lamp 70A. Since the fluorescent layer 71 is disposed more closely to the transparent pixel electrode 21, color spreads are reduced and clearer images can be produced. With the arrangement of FIG. 9, the transparent plate 72 must be made of a material capable of transmitting ultraviolet radiation, and such a material should preferably be transparent quartz, transparent Pyrex or Vycor (commercial names, manufactured Corning Glass Works).

Figure 10:
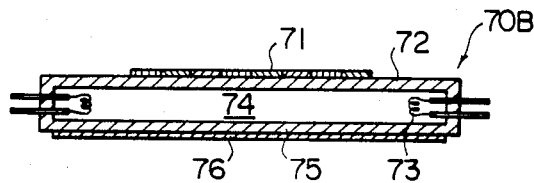
FIG. 10 is a cross-sectional view of still another lamp as a fluorescent light-emitting means.

According to a further modification shown in FIG. 10, a reflecting film 76 for reflecting ultraviolet radiation is disposed on an outer surface of a tube wall 75 of a lamp 70B serving as the fluorescent light-emitting means remotely from the transparent plate 72 of the lamp 70B. Where the reflecting film 76 is made of aluminum or silver, it can double as a rapid-start electrode for improving rising characteristics of the lamp 70B at the time it is turned on. The reflecting film may also be attached to the tube wall 75 of the lamp 70 as shown in FIG. 7 in which the fluorescent layer 71 is disposed on the inner surface of the transparent plate 72.

Emission of ultraviolet radiation from the lamp will be described in greater detail.

The sealed gas 74 of mercury and argon in the lamp 70 is controlled such that the mercury is kept under a vapor pressure ranging from $1 \times 10^{-2}$ Torr to $1 \times 10^{-3}$ Torr and the argon is kept under a vapor pressure ranging from 1 Torr to 5 Torr under normal operation condition. When a current is passed through the filament 73 from a power supply and an igniting circuit (not shown), the filament 34 is heated up to a temperature at which thermions are emitted. The emitted thermions collide with moving atoms of vaporized argon and ionize them, thus starting an electric discharge. The thermions and ionized argon atoms then collide with mercury atoms and ionize them, whereupon electromagnetic radiation having a wavelength of 2537 Å is emitted as main ultraviolet light.

The transparent plate 72 supporting the fluorescent layer 71 may be made of the same material as that of the transparent plates 2, 3 of the liquid crystal cell 1. Where the lamps shown in FIGS. 9 and 10 are employed, the transparent plate 72 is made of transparent quartz, Pyrex or Vycor, for example, capable of passing ultraviolet radiation of the wavelength of 2537 Å therethrough.

Although the fluorescent material for the fluorescent layer is primarily powdery in nature, there may be employed a particulate fluorescent material mixed with or colored by a fluorescent dye.

Figure 11:
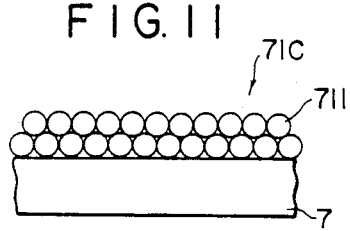
FIG. 11 is an enlarged fragmentary view of a fluorescent layer.

FIG. 11 schematically shows, on an enlarged scale, an arrangement in which a fluorescent layer 71C composed of a particulate fluorescent material 711 is disposed on the transparent plate 7 as shown in FIG. 1. The particulate fluorescent material 711 comprises minute particles colored with a fluorescent dye and is deposited on the transparent plate 7 by dispensing the minute particles in a resin lacquer solution to produce a wax-like mixture, and applying the wax-like mixture to the transparent plate 7 by a masking printing process. The spherical particles of the particulate fluorescent material may be made of ceramic, a copolymer of divinylbenzene, polystylene, benzoguanamine, or the like, and should preferably have a diameter ranging from 5 to 20 μm particularly from 5 to 10 μm. The transparent plate 7 may be of glass or plastic film, as described above.

According to an experiment, 5 parts of Epocolor-FP-30 (manufactured by Nihon Shokubai Kagaku Kogyosha) which is composed of minute particles of benzoguanamine colored by a fluorescent dye and 500 parts of a 20%-alcohol solution of polyvinyl acetate were mixed and kneaded sufficiently to produce a uniform paste, which was printed and baked on a glass plate, thereby forming a fluorescent layer composed of a red particulate fluorescent material highly capable of emitting fluorescent radiation. For the fluorescent layer of the particulate fluorescent material has an additional light-scattering effect as compared with a fluorescent layer having a flat fluorescent dye layer, and hence can emit brighter light with a clearer hue.

Fluorescent layer elements composed of red, green, and blue particulate fluorescent materials may be printed and baked in a mosaic pattern on a transparent plate, and a transparent electrode may be formed of indium oxide/Sn on the fluorescent layer elements. The resultant construction may be used as one (such as indicated by the reference numeral 1 in FIG. 1) of the transparent plates of the liquid crystal cell. This arrangement makes the liquid crystal cell simpler in structure.

Figure 12:
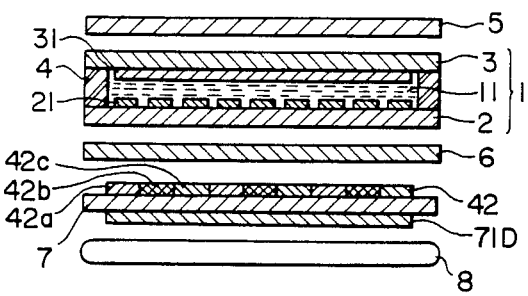
FIG. 12 is an exploded cross-sectional view of a liquid crystal color display device according to a still further embodiment of the present invention.

According to an embodiment illustrated in FIG. 12, a fluorescent layer 71D is mounted on the transparent plate 7 interposed between the lamp 8 and the polarizer 6, the fluorescent layer 71D being disposed on a surface of the transparent plate 7 which faces the lamp 8. A color filter 42 is mounted on an opposite surface of the transparent plate 6 which faces the polarizer 6. The lamp 8, the transparent plate 7, the fluorescent layer 71D, and the color filter 42 jointly constitute a fluorescent light-emitting means. The color filter 42 is of a mosaic pattern composed of minute filter elements 42a for passing red light therethrough, minute filter elements 42b for passing green light therethrough, and minute filter elements 42c for passing blue light therethrough. Each of these filter elements 42a, 42b, 42c will hereinafter be referred to as a "pixel filter". The pixel filters are aligned respectively with the electrode elements of the transparent pixel electrode 21.

The fluorescent layer 71D uniformly constains fluorescent materials capable of emitting red, green, and blue fluorescent light, but is not divided into elements.

Figure 13:
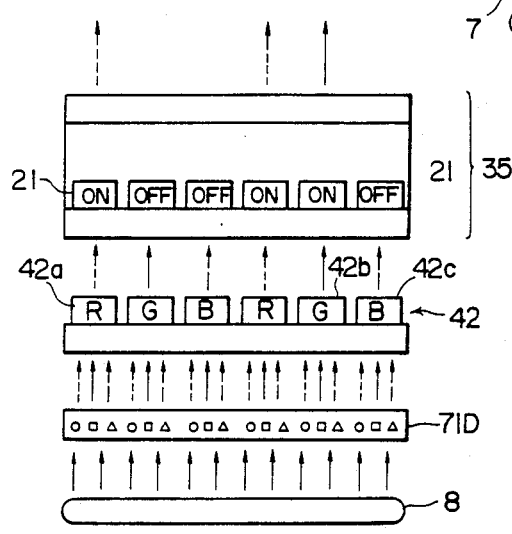
FIG. 13 is a schematic diagram showing operation of the liquid crystal color display device illustrated in FIG. 12.

FIG. 13 is explanatory of operation of the liquid crystal color display device shown in FIG. 12. When the lamp 8 is energized, the fluorescent materials (for emitting light in red; green; and blue) in the fluorescent layer 71D are excited to emit three lights in red (indicated by R), green (indicated by G), and blue (indicated by B), these lights being indicated by -----→,--- ➝ , respectively, in FIG. 13. These lights fall on the pixel filters of the color filter 42. The red pixel filters 42a (R) pass the red light (R-----→), the green pixel filters 42b (G) pass the green light (G→), and the blue pixel filters 42c (B) pass the blue light (B---- ➝). The red, green, and blue lights having passed through the respective pixel filters then enter a liquid crystal unit 35 of FIG. 13, which is composed of the liquid crystal cell 1 and the polarizers 5, 6. As described above, the electrode elements of the transparent pixel electrode 21 in the liquid crystal unit 35 are aligned respectively with the pixel filters of the color filter 42. Therefore, when a voltage representing a color image signal is applied to the transparent pixel electrode 21 by thin-film transistors (not shown), the lights passing through the liquid crystal unit 35 can be controlled. The liquid crystal unit 35 includes a 90°-TN cell interposed between parallel polarizers having their axes of polarization normal to each other. Only those rays of light which have passed through the pixel filters corresponding to the energized electrode elements can pass through the liquid crystal unit 35 and is observed as an image displayed in full colors. In FIG. 13, the R light and G light have passed through the liquid crystal unit in the proportion of 2:1.

Figure 14:
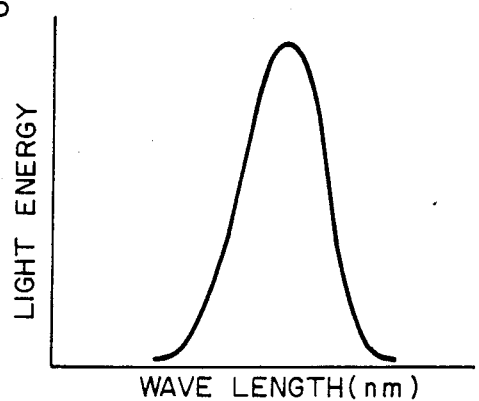
FIGS. 14 through 16 are graphs explanatory of operation of a color filter.
Figure 15:
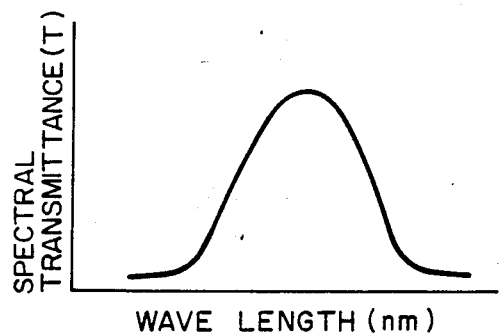
Figure 16:
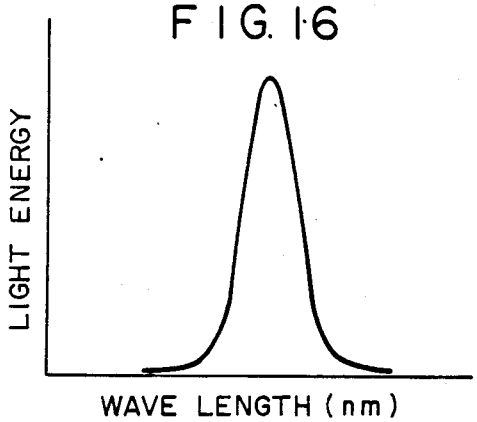

The light entering the color filter 42 is mixed fluorescent radiation of R, G, B emitted by the fluorescent layer 71D, and is brighter than ordinary light emitted by a white-color light source. While white light has an energy distribution lying fully across a wavelength range having a visible wavelength range in its center and includes light in a wavelength range which does not substantially contribute to color separation into the three primaries R, G, B, almost all light energy of the light emitted from the R, G, B fluorescent materials is utilized for color separation. With the fluorescent light emitted from the fluorescent materials, therefore, the energy utilization efficiency is high, and it is possible to produce bright images. The light generated by passing the R, G, B fluorescent radiations through the R, B, B pixel filters, respectively, is represented by the product of fluorescent wavelength characteristics and pixel filter wavelength characteristics, and hence has a sharp rising edge and is light having a small half-value width and approaching monochromatic light, with the result that bright images can be produced. Where the G fluorescent radiation from the green fluorescent material has a spectral wavelength characteristics as shown in FIG. 14, for example, and falls on the green (G) pixel filter 42b having a characteristics of FIG. 15, the light having passed through the G pixel filter has a spectral characteristics as shown in FIG. 16, that is, becomes G light close to monochromatic light having a clear-cut characteristic curve. Since the fluorescent radiation from the fluorescent material has a large amount of light energy, a bright image can be generated from the light having passed through the color filter.

Figure 17:
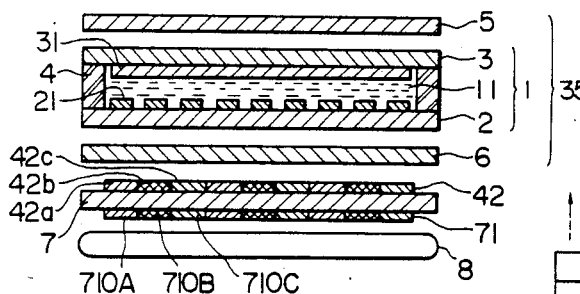
FIG. 17 is an exploded cross-sectional view of a liquid crystal color display device according to another embodiment of the present invention.
Figure 18:
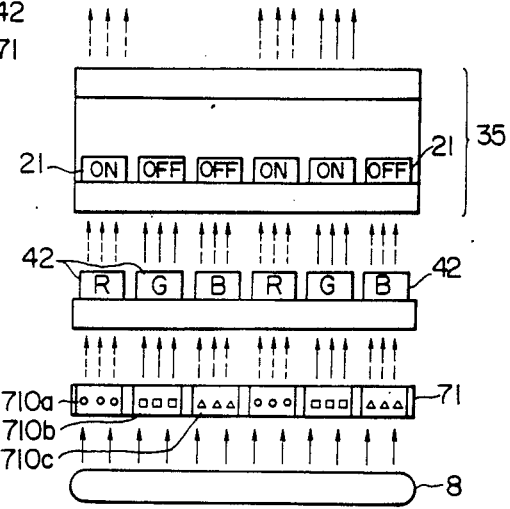
FIG. 18 is a schematic diagram showing operation of the liquid crystal color display device illustrated in FIG. 17.

FIG. 17 shows another embodiment in which the fluorescent layer 71 is of a mosaic pattern composed of fluorescent layer elements which are aligned with the pixel filters and the electrode elements. FIG. 18 is illustrative of operation of the liquid crystal color display device shown in FIG. 17. In FIG. 18, the fluorescent layer 71 is composed of mosaic-patterned fluorescent layer elements 710A, 710B, 710C for passing red (R), green (G), and blue (B) lights, respectively. The arrangement of FIGS. 17 and 18 allows a greater amount of energy of R, G, B lights to pass through the pixels and be observed as more detailed images than the arrangement of FIGS. 12 and 13.

Modifications of the embodiment of FIG. 12 will be described hereinbelow.

Figure 19:
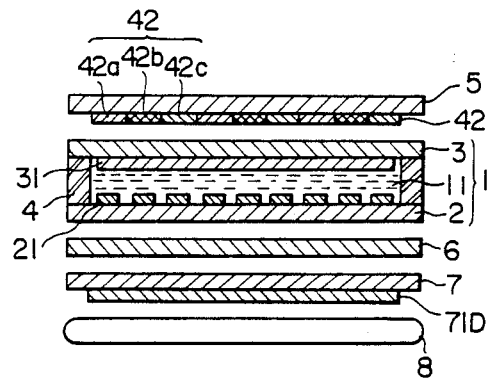
FIG. 19 is an exploded cross-sectional view of a liquid crystal color display device according to another embodiment of the present invention.

FIG. 19 shows an arrangement in which the color filter 42 is mounted on a surface of the polarizer 5 which is on the side of the liquid crystal cell 1 to be observed by the observer.

Figure 20:
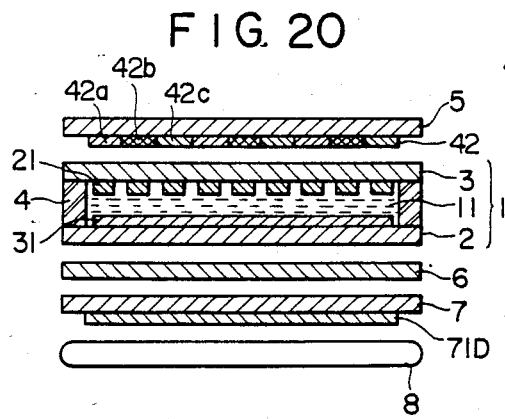
FIG. 20 is an exploded cross-sectional view of a liquid crystal color display device according to still another embodiment of the present invention.

In a modification shown in FIG. 20, the transparent pixel electrode 21 and the transparent electrode 31 are positionally switched around in the liquid crystal cell 1 in FIG. 19. The liquid crystal color display device of FIG. 20 can produce clearer images than that of FIG. 19 because the transparent pixel electrode 21 and the color filter 42 are located closely to each other.

Figure 21:
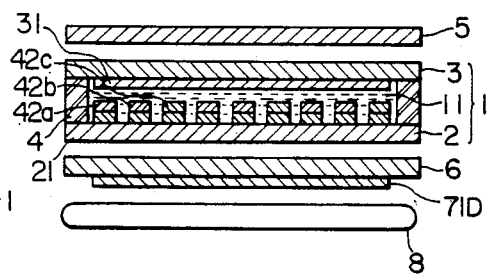
FIG. 21 is an exploded cross-sectional view of a liquid crystal color display device according to still another embodiment of the present invention.

According to another modification of FIG. 21, the pixel filters 42a, 42b, 42c of the color filter 42 are disposed respectively on the electrode elements of the transparent pixel electrode 21 to prevent the pixel filters from being misaligned with the pixel electrode elements. The fluorescent layer 71d is disposed on the second polarizer 6 to make the overall construction thinner in profile.

Figure 22:
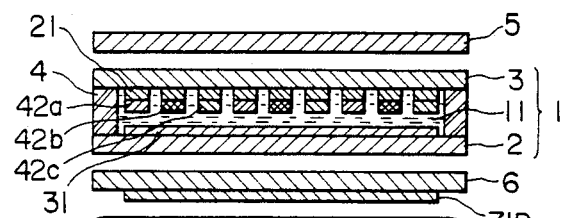
FIG. 22 is an exploded cross-sectional view of a liquid crystal color display device according to still another embodiment of the present invention.

The arrangement of FIG. 22 is of substantially the same as that of FIG. 21 except that the pixel electrode 21 and the pixel filters 42a, 42b, 42c are disposed on the upper plate 3 of the liquid crystal cell 1.

Figure 23:
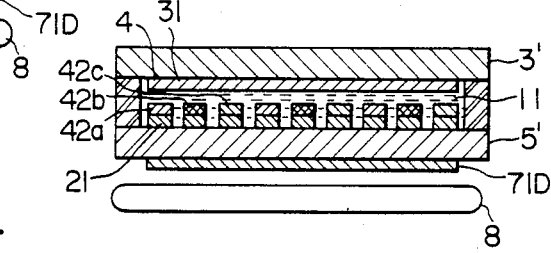
FIG. 23 is an exploded cross-sectional view of a liquid crystal color display device according to still another embodiment of the present invention.

According to a modification of FIG. 23, the upper and lower plates of the liquid crystal cell are composed of polarizer plates 3', 5' to achieve a thinner construction. The fluorescent layer 71D is disposed on the lower polarizer plate 5'.

The fluorescent layer 71 shown in FIG. 1 can also be employed in the modifications illustrated in FIGS. 19 through 23.

The color filter can be deposited by a photolithograpic process, an electrodeposition process, a vacuum evaporation process, a printing process, or the like. Although the color filter may comprise a dichroic mirror having a multilayer film composed of a material of a high refractive index and a material of a low refractive index or a dye filter, the dye filter is more advantageous in terms of cost. The dye used in the dye filter may be Lanyl red GG for red pixel filters, Suminol milling yellow MR and Cibacron turquoise blue TG-E for green pixel filters, and Cyanine 6B for blue pixel filters.

While in each of the above embodiments the transparent pixel electrode is employed and driven as by TFTs in an active matrix drive mode for full-color image display, other electrode arrangements may be used, and monochromatic or multicolor image display other than the full-color image display may be performed.

For example, stripes of electrodes may be provided in X and Y directions, and pixel filters and also pixel fluorescent elements may be disposed in alignment with intersections of the electrode stripes (see FIG. 5) for displaying images in full colors in a multiplex drive mode. With such a modification, the liquid crystal cell, the fluorescent layer, and the color filter may be arranged in the same manner as described above. Since the multiplex drive mode has a limitation on a higher duty cycle due to a crosstalk effect, the active matrix drive mode is more advantageous than the multiplex drive mode.

Figure 24:
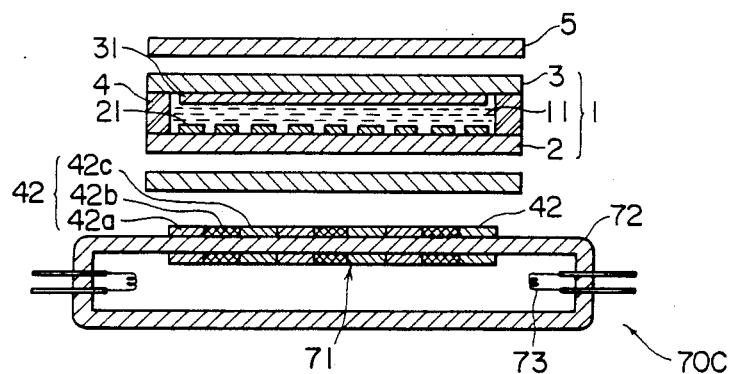
FIG. 24 is an exploded cross-sectional view of a liquid crystal color display device according to still another embodiment of the present invention.
Figure 25:
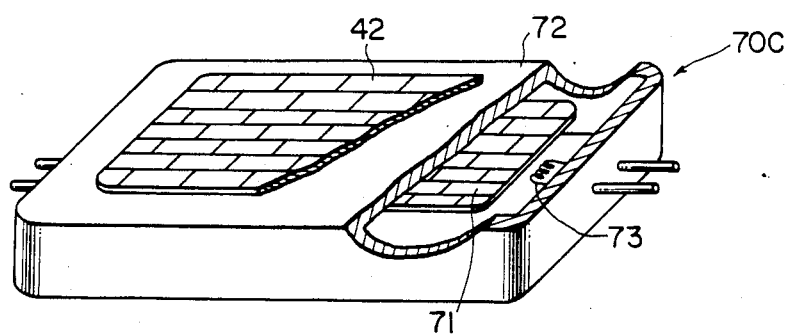
FIG. 25 is a perspective view, partly cut away, of a lamp as a fluorescent light-emitting means employed in the liquid crystal color display device illustrated in FIG. 24.

A liquid crystal color display device shown in FIG. 24 has a lamp 70C serving as a fluorescent light-emitting means and has the color filter 42 disposed on an outer wall surface of the lamp 70 (identical to the lamp 70 in FIG. 7) which faces the liquid crystal cell 1. The color filter 42 is composed of pixel filters arranged in alignment with the respective fluorescent layer elements of the fluorescent layer 71 on the inner wall surface of the lamp 70. The lamp 70C is also illustrated in the perspective view of FIG. 25, partly cut away.

Figure 26:
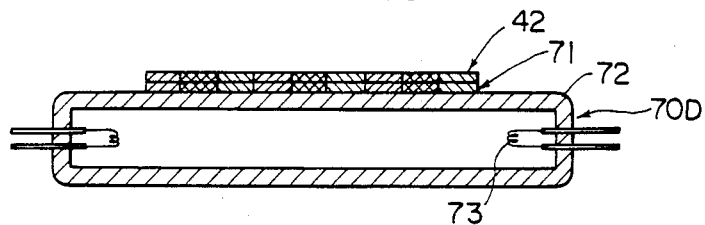
FIG. 26 is a cross-sectional view of another lamp as a fluorescent light-emitting means.
Figure 27:
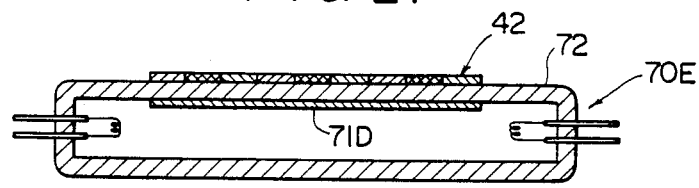
FIG. 27 is a cross-sectional view of still another lamp as a fluorescent light-emitting means.
Figure 28:
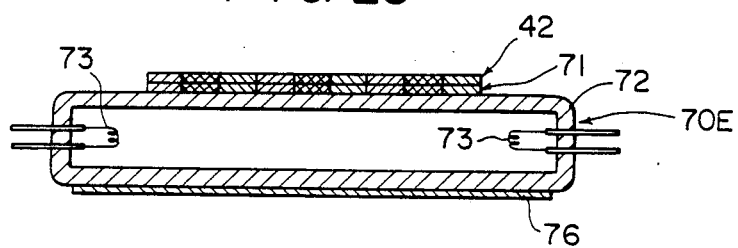
FIG. 28 is a cross-sectional view of a still further lamp as a fluorescent light-emitting means.

A lamp 70D shown in FIG. 26 as a fluorescent lightemitting means has the color filter 42 superimposed on the fluorescent layer 71 disposed on the outer wall surface of the lamp (identical to the lamp 70A in FIG. 9). In FIG. 27, a fluorescent layer 71D is disposed on an inner wall surface of a lamp 70E. FIG. 28 shows still another lamp 70F serving as a fluorescent light-emitting means and having the color filter 42 superimposed on the fluorescent layer 70a on the lamp (identical to the lamp 70B in FIG. 10). These lamps 70, 70A, 70B, 70C, 70D, 70E, 70F can themselves be used as novel light sources for illuminating originals in a color separating device in a color copying machine.

The color filters shown together with the fluorescent layers and the lamps in the fluorescent light-emitting means in FIGS. 12, 17, 19, 20, 21, 22, 23, and 24 have the function described with reference to FIGS. 14, 15, and 16.

Figure 29A:
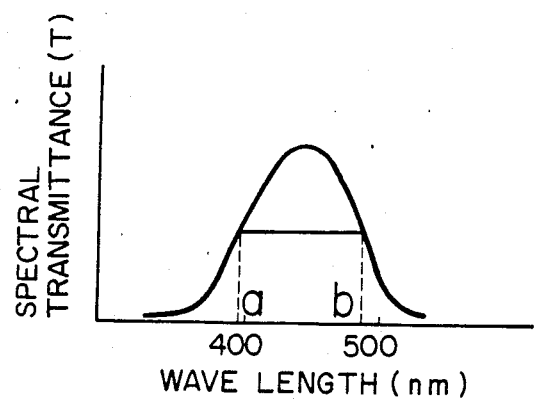
FIGS. 29(A), 29(B), 30(A), 30(B), 31(A), 31(B), and 32 are graphs explanatory of the relationship between wavelength distributions of emitted fluorescent radiation and spectral transmittances of color filters.
Figure 29B:
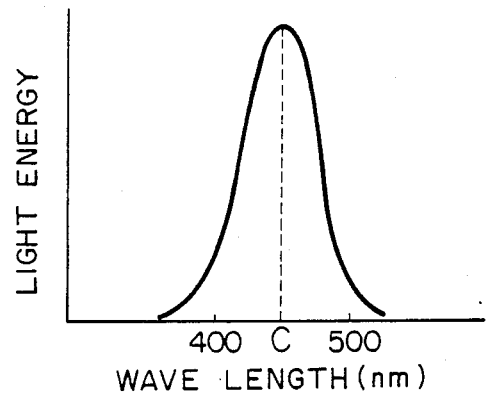
Figure 30A:
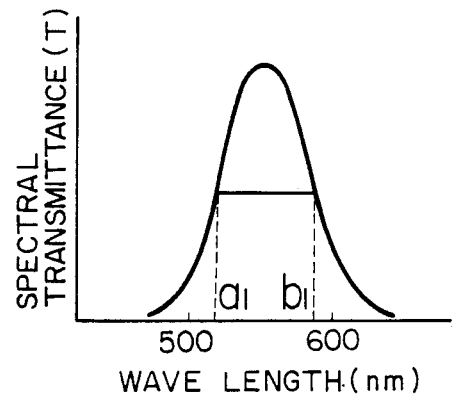
Figure 30B:
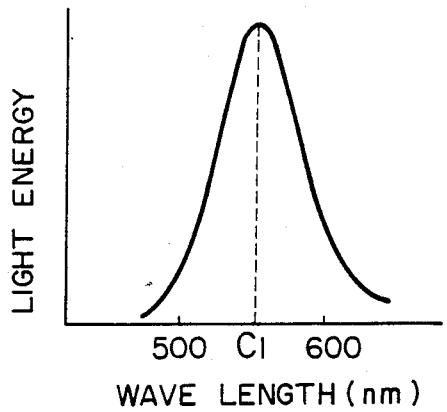
Figure 31A:
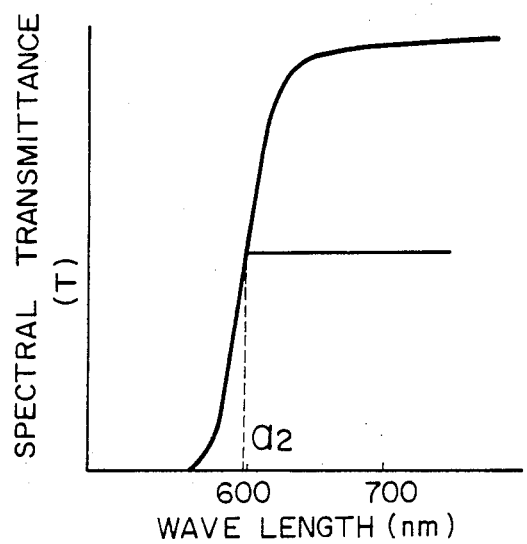
Figure 31B:
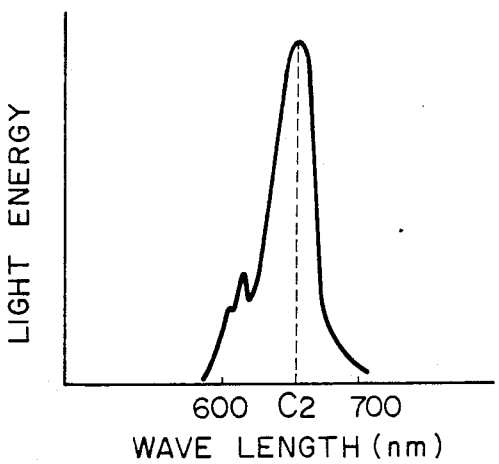
Figure 32:
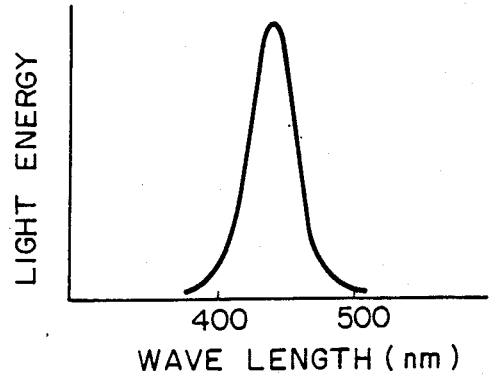

Light energy can effectively be utilized for increasing the color purity of displayed images by selecting the wavelength of fluorescent light in each color emitted from the fluorescent layer to fall within the width of the half value of the transmittance of each pixel filter in the color filter. For example, where the pixel filter for passing blue light has spectral characteristics as shown in FIG. 29(A), the maximum wavelength C (FIG. 29(B)) of blue fluorescent light emitted by the fluorescent layer is selected to be positioned between a wavelength range in the width a - b of the half value of the spectral transmittance. Then, the blue light having passed through the pixel filter has a clear-cut characteristic curve as shown in FIG. 32, in which the blue light is closer to monochromatic blue light. Inasmuch as the fluorescent radiation from the fluorescent material has a large amount of light energy, bright light can be obtained from the filter.

Where the pixel filter for passing green light has spectral characteristics as shown in FIG. 30(A), the maximum wavelength $C_1$ (FIG. 30(B)) of green fluorescent light is selected to be positioned between a wavelength range in the width $a_1$-$b_1$ of the half value of the spectral transmittance.

Where the pixel filter for passing red light has spectral characteristics as shown in FIG. 31(A), the spectral characteristics of the red fluorescent light is selected to be as shown in FIG. 31(B).

Fluorescent materials having the peak values C, $C_1$, $C_2$ include NP102, NP220, and NP320 (commercial names, manufactured by Nichia Chemical). When these fluorescent materials are illuminated with ultraviolet radiation, they emit fluorescent light having peaks at wavelengths 460 nm, 544 nm, and 620 nm, respectively.

By thus selecting the maximum wavelength of fluorescent radiation from the fluorescent layer to fall within the width of the half value of the spectral transmittance of the color filter, almost all light energy can be utilized for color separation, with the result that the energy utilization efficiency is high and bright images can be displayed.

In the event the color filter is used, the transparent electrode in the liquid crystal cell may be arranged as shown in FIGS. 5 and 6.

Although certain preferred embodiments have been shown and described, it should be understood that many changes and modifications may be made therein without departing from the scope of the appended claims.

What is claimed as new and desired to be secured by Letters Patent of the United States is:

1. A liquid crystal color display device for displaying a color image in response to a given image signal, comprising:
    a liquid crystal cell composed of a liquid crystal material, a pair of transparent plates sandwiching said liquid crystal material therebetween, a transparent electrode mounted on one of said transparent plates and composed of plural electrode elements, and a flat transparent electrode mounted on the other transparent plate in confronting relation to said plural electrode elements;
    at least one polarizer;
    a color filter composed of a plurality of filters for passing red, green, and blue fluorescent lights therethrough, said filters being disposed in alignment with respective of said electrode elements;
    fluorescent light-emitting means comprising a fluorescent layer and a lamp for generating electromagnetic radiation, said fluorescent layer being composed of a plurality of fluorescent layer elements capable of emitting red, green, and blue fluorescent lights in response to application thereto of electromagnetic radiation from said lamp, said fluorescent layer elements being aligned with respective of the plurality of filters of said color filter; and
    said liquid crystal cell, said at least one polarizer, and said lamp being successively arranged in the order named away from an observation side, said color filter being disposed more closely to the observation side than said fluorescent layer.

2. A liquid crystal color device according to claim 1, further comprising:
    said fluorescent layer disposed between said at least one polarizer and said lamp.

3. A liquid crystal color display according to claim 2, further comprising:
    an additional polarizer facing said liquid crystal cell on a side of said cell opposite said lamp.

4. A liquid crystal color display according to claim 2, wherein said fluorescent layer is formed on a surface of said at least one polarizer facing said lamp.

5. A liquid crystal color display according to claim 4, further comprising:
    an additional polarizer facing said liquid crystal cell on a side of said cell opposite said lamp.

6. A liquid crystal color display device according to claim 4, further comprising:
    said color filter disposed on one of the pair of transparent plates of said liquid crystal cell, said one of said pair of transparent plates facing said at least one polarizer.

7. A liquid crystal color display according to claim 6, further comprising:
    an additional polarizer facing said liquid crystal cell on a side of said cell opposite said lamp.

8. A liquid crystal color display device according to claim 4, wherein said color filter is formed on a surface of said at least one polarizer facing said liquid crystal cell.

9. A liquid crystal color display according to claim 8, further comprising:
    an additional polarizer facing said liquid crystal cell on a side of said cell opposite said lamp.

10. A liquid crystal color display device according to claim 1, further comprising:
    said color filter formed on a surface of one of the pair of transparent plates of said liquid crystal cell facing said first polarizer, and
    said liquid crystal color display device further comprising an additional transparent plate disposed between said at least one polarizer and said lamp, said fluorescent layer formed on a surface of said additional transparent plate facing said lamp.

11. A liquid crystal color display according to claim 10, further comprising:
    an additional polarizer facing said liquid crystal cell on a side of said cell opposite said lamp.

12. A liquid crystal color display device according to claim 1, comprising:
    an additional transparent plate disposed between said first polarizer and said lamp, said additional transparent plate having opposed surfaces including a first surface facing said lamp and a second surface facing said polarizer, said fluorescent layer formed on said first surface and said color filter formed on said second surface.

13. A liquid crystal color display according to claim 12, further comprising:
    an additional polarizer facing said liquid crystal cell on a side of said cell opposite said lamp.

14. A liquid crystal color display according to claim 1, further comprising:
   an additional polarizer facing said liquid crystal cell on a side of said cell opposite said lamp.

15. A liquid crystal color display device according to claim 1, wherein said plurality of electrode elements comprises perpendicular stripe electrodes.

16. A liquid crystal color display device according to claim 1, wherein said plurality of electrode elements comprises a matrix of minute electrode elements.

17. A liquid crystal color display device according to claim 16, wherein said color filter comprises a mosaic pattern of minute pixel filters.

18. A liquid crystal color display device according to claim 17, wherein said fluorescent layer comprises a mosaic of minute fluorescent layer elements aligned with respective of the pixel filters of said color filter.

19. A liquid crystal display device according to claim 1, wherein said plurality of electrode elements comprises a plurality of electrode segments.

* * * * *